(12) United States Patent
Bullock

(10) Patent No.: US 8,979,449 B2
(45) Date of Patent: Mar. 17, 2015

(54) LOAD RESTRAINT STRIP

(71) Applicant: Matthew Bullock, McLean, VA (US)

(72) Inventor: Matthew Bullock, McLean, VA (US)

(*) Notice: Subject to any disclaimer, the term of this patent is extended or adjusted under 35 U.S.C. 154(b) by 0 days.

(21) Appl. No.: 13/959,879

(22) Filed: Aug. 6, 2013

(65) Prior Publication Data

US 2015/0043988 A1 Feb. 12, 2015

(51) Int. Cl.
*B60P 7/08* (2006.01)

(52) U.S. Cl.
CPC .................................. *B60P 7/0823* (2013.01)
USPC ......................................................... 410/96

(58) Field of Classification Search
CPC ...... B61D 45/001; B61D 45/003; B32B 7/12; B32B 5/08; B32B 5/26; B32B 27/08; B32B 27/12; C09J 7/0296; B60P 7/0823; B60P 7/135; B60P 7/0884; B60P 7/08; B60P 7/0876; B60P 7/15
USPC ........... 410/96, 97, 34, 118, 32, 42, 100, 155; 220/1.5; 206/410, 597; 53/399, 441, 53/462, 556; 248/499
See application file for complete search history.

(56) References Cited

U.S. PATENT DOCUMENTS

| | | | |
|---|---|---|---|
| 4,264,251 A * | 4/1981 | Blatt | 410/100 |
| 5,784,761 A * | 7/1998 | Allen | 24/16 R |
| 6,089,802 A | 7/2000 | Bullock | |
| 6,227,779 B1 | 5/2001 | Bullock | |
| 6,607,337 B1 | 8/2003 | Bullock | |
| 6,896,459 B1 | 5/2005 | Bullock | |
| 6,923,609 B2 | 8/2005 | Bullock | |
| 6,981,827 B2 | 1/2006 | Bullock | |
| 7,018,151 B2 | 3/2006 | Bullock | |
| 7,066,698 B2 | 6/2006 | Bullock | |
| 7,290,969 B2 | 11/2007 | Bullock | |
| 7,329,074 B2 | 2/2008 | Bullock | |
| 8,113,752 B2 | 2/2012 | Bullock | |
| 8,128,324 B2 | 3/2012 | Bullock | |
| 8,403,607 B1 | 3/2013 | Bullock | |
| 8,403,608 B1 | 3/2013 | Bullock | |
| 8,403,609 B1 | 3/2013 | Bullock | |
| 8,408,852 B1 | 4/2013 | Bullock | |
| 8,419,329 B1 | 4/2013 | Bullock | |
| 2005/0123371 A1 * | 6/2005 | Bullock | 410/97 |
| 2008/0181742 A1 * | 7/2008 | Dry et al. | 410/118 |
| 2009/0056870 A1 * | 3/2009 | Glenn | 156/304.7 |
| 2012/0020743 A1 * | 1/2012 | Tietjen | 405/250 |

* cited by examiner

Primary Examiner — Glenn Dayoan
Assistant Examiner — Sunsurraye Westbrook
(74) Attorney, Agent, or Firm — Banner & Witcoff, Ltd.

(57) ABSTRACT

A working portion of load restraint strip may include an attachment region. The attachment layer may include an adhesive layer. When the adhesive layer is exposed, at least part of the attachment region on an exterior side of the load restraint strip is colored differently from regions on the exterior side outside the attachment region.

21 Claims, 16 Drawing Sheets

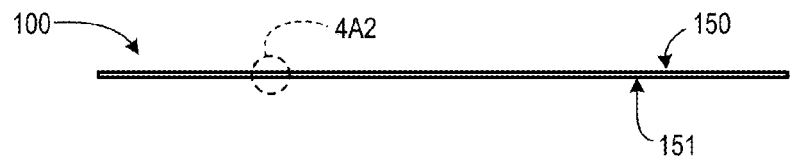
FIG. 4A1
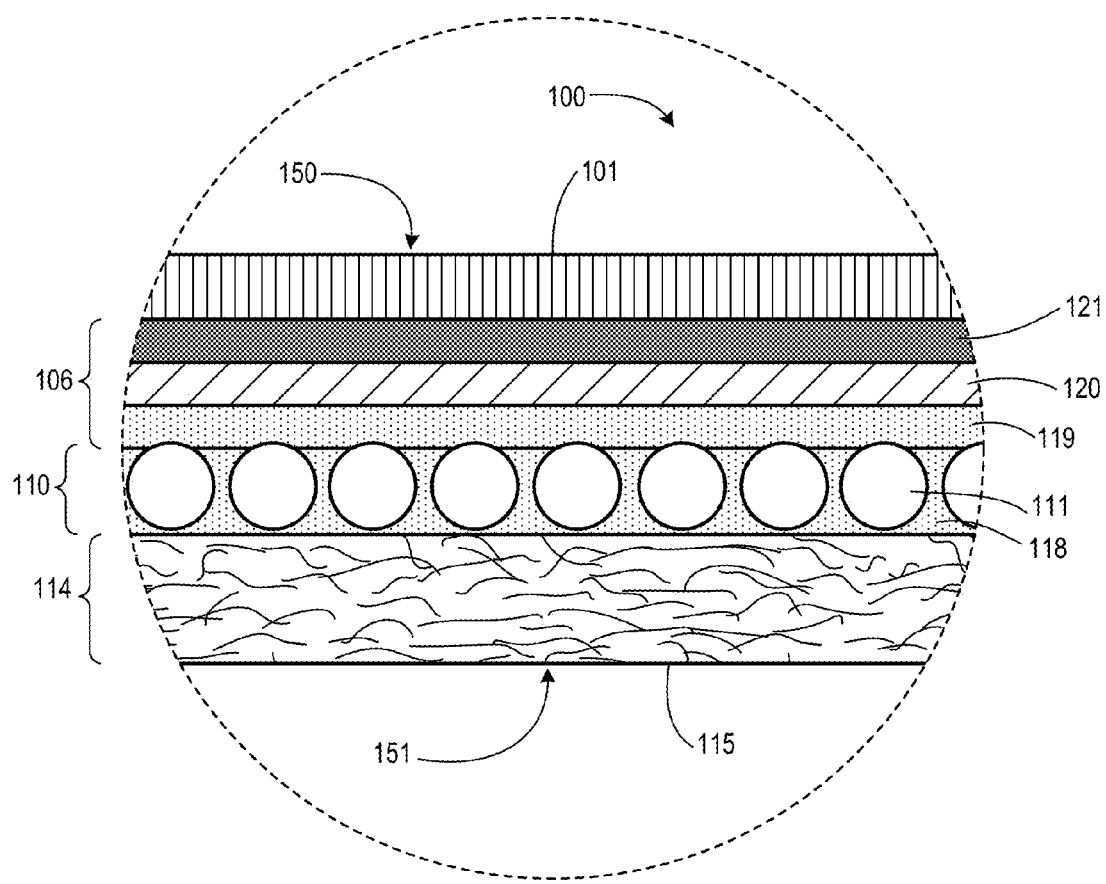
FIG. 4A2

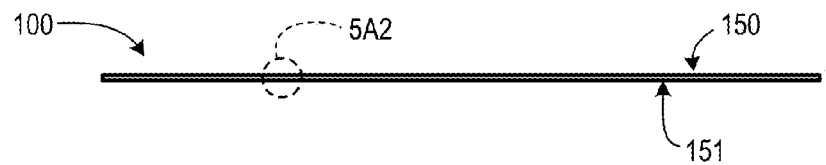
FIG. 5A1
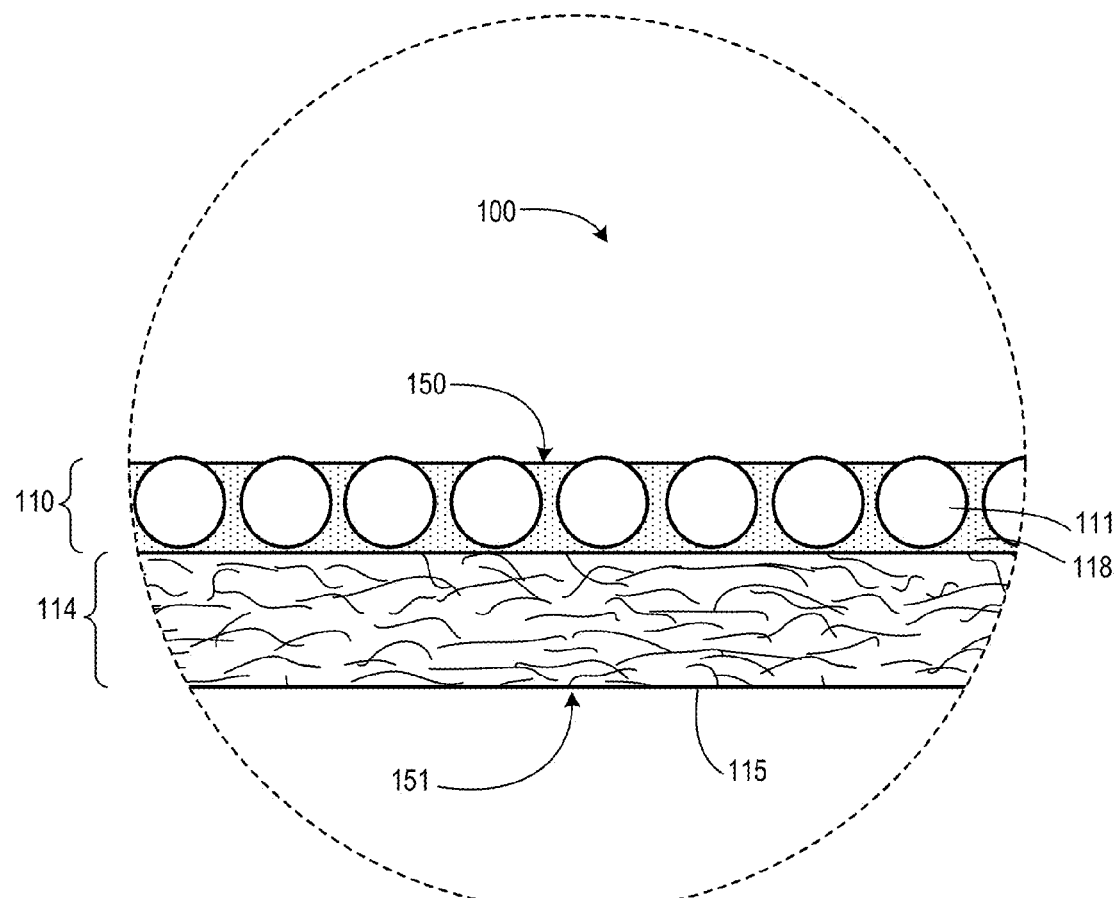
FIG. 5A2

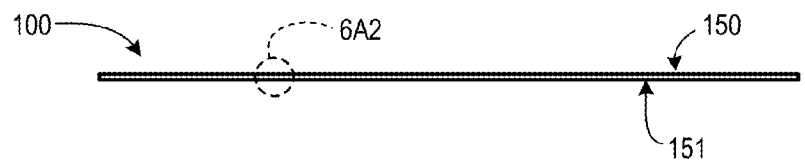
FIG. 6A1
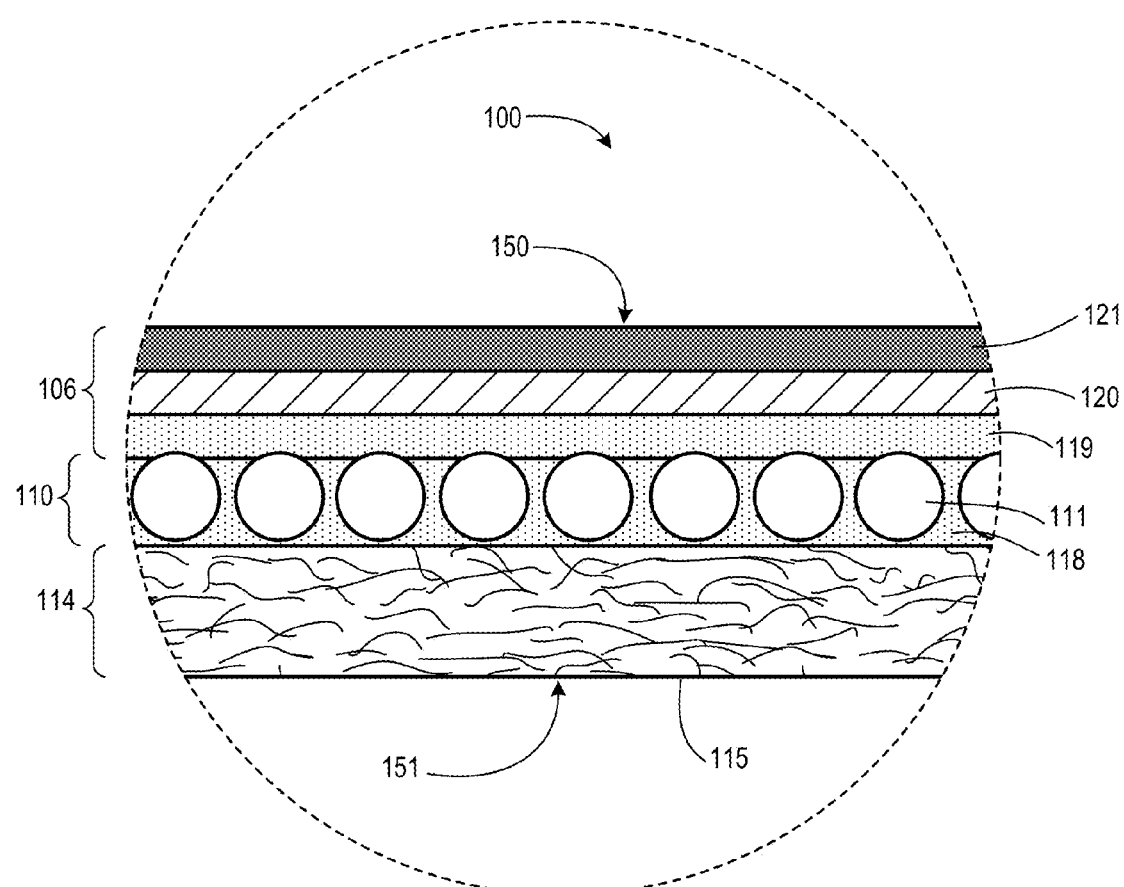
FIG. 6A2

LOAD RESTRAINT STRIP

BACKGROUND

Intermodal containers are commonly used when shipping goods domestically and/or internationally. Such containers can be loaded onto cargo ships for transport across oceans or other bodies of water. For land transport, these containers can be placed onto a trailer and then hauled overland by truck. Such containers can also be loaded onto railroad flatcars for transport.

Shipping containers can be loaded with boxes, crates, drums, reinforced bags, plastic wrapped bundles, cased goods, metal coils, specialty heavy paper rolls, plastic or metal containers mounted on pallets, and/or numerous other forms of cargo. Maritime and surface transportation regulations require that such loads be restrained from lateral shifting. In particular, a shipping container may experience significant movement as the container is carried by ocean vessel or by other conveyance. If cargo within the intermodal container is not restrained, it may shift and collide with a container wall or container doors. Because the mass of cargo in a container can be significant, such shifting and/or collisions can have catastrophic consequences for transport workers and for the public at large. For example, shifting cargo can be damaged when colliding with a container wall and/or be crushed by other shifting cargo. Damaged cargo can lead to release of product, which product may be toxic or otherwise be hazardous. As another example, shifting cargo might change the center of gravity of the shipping container itself and thereby cause significant problems for the ship, truck or other vehicle carrying the container.

FIG. 1 illustrates a known technique for restraining cargo within a shipping container 101. A portion of a top 103 and right side wall 102R have been cut away from container 101 to reveal cargo loaded therein. In the example of FIG. 1, the cargo includes a load of crates 104 and drums 105. FIG. 1 further shows a portion of an interior of a left side wall 102L. Crates 104 and drums 105 are secured against movement toward the rear 111 of container 101 by a restraint system that includes multiple restraining strips 106. Each strip 106 is flexible and has an adhesive-coated end 107. An end 107a of a first strip 106a is pressed against an interior surface of side wall 102R. The other end 108a of strip 106a is then wrapped around the rear of a portion of crates 104. Strip end 107a and other strip ends in FIG. 1 are stippled to indicate the presence of adhesive; the stippling in FIG. 1 is not intended to indicate a color differential.

A second strip 106b is similar to strip 106a and has an adhesive-coated end (not shown) similar to end 107a of strip 106a. The adhesive-coated end of strip 106b is secured to the interior surface of side wall 102L in a position that is at generally the same height as end 107a. The end 108b of the strip 106b is then wrapped around the rear of the portion of crates 104 similar to end 108a. Ends 108a and 108b are then tightened (e.g., using a tool and method such as is described in U.S. Pat. No. 6,981,827, incorporated by reference herein). A third adhesive-backed strip 109 is then applied over the tightened ends 108a and 108b to secure those ends together. In a similar manner, strips 106c and 106d and other pairs of strips 106 are used to secure crates 14 and drums 105 from lateral movement.

There are various types of known restraining strips that can be used in the configuration of FIG. 1. Such strips typically include a backing and some form of reinforcement. Examples of known strips are described in one or more of U.S. Pat. Nos. 6,089,802, 6,227,779, 6,607,337, 6,896,459, 6,923,609, 7,018,151, 7,066,698, 7,290,969, 7,329,074, 8,113,752, 8,128,324, 8,403,607, 8,403,608, 8,403,609, 8,408,852 and 8,419,329. Use of these and other types of restraining strips such as is shown in FIG. 1 represents a substantial improvement over previous methods for restraining cargo. However, there remains a need for improved load restraint strips that can be used in systems such as those shown in FIG. 1.

For example, proper installation of load restraint strips can significantly affect the performance and load restraint capacity of the load restraint system formed by those strips. Improper placement of a restraint strip adhesive-coated end (e.g., end 107a in FIG. 1) accounts for a high percentage of restraint system failures. If such an adhesive-coated end is not placed properly, the overall system strength can be substantially reduced. In many cases, personnel installing load restraint strips may be working very quickly so as to maximize cargo loading throughput. Such installation personnel may be unskilled workers or may be subject to less than ideal supervision. After a container has been loaded, inspecting a restraint system installation may be difficult. For example, the inside of a cargo container may be poorly lit and it may be difficult to see the portions of load restraint strips that are attached to the container wall. This difficulty may be compounded by placement of cargo very close to the container wall, thereby leaving insufficient space for a supervisor, marine surveyor or other person to access the wall-adhered end for a close inspection.

SUMMARY

This Summary is provided to introduce a selection of concepts in a simplified form that are further described below in the Detailed Description. This Summary is not intended to identify key or essential features of the invention.

At least some embodiments include a load restraint strip. The load restraint strip may include a base layer extending throughout a working portion of the load restraint strip, The base layer may include a base layer material. The load restraint strip may further include a reinforcement layer fixed relative to the base layer. The reinforcement layer may extend throughout the working portion of the load restraint strip and include a reinforcement material. The load restraint strip may further include an attachment layer fixed relative to the base and reinforcement layers and located in an attachment region on an exterior side of the load restraint strip. The attachment layer may include a first adhesive layer. The attachment region may have a length less than a length of the working portion. When the first adhesive layer is exposed, at least part of the attachment region on the exterior side is colored differently from regions on the exterior side outside the attachment region.

Some embodiments include a method. The method may include affixing an attachment region of an exterior face of a first load restraint strip to a wall of a cargo container. The method may further include affixing an attachment region of an exterior face of a second load restraint strip to another wall of the cargo container. The method may additionally include joining the first load restraint strip to the second load restraint strip. The method may also include determining whether substantially all of the attachment region of the first load restraint strip is affixed to the wall of the cargo container by determining the visibility of a portion of the attachment region of the first load restraint strip having a different color than other portions of the first load restraint strip exterior face.

BRIEF DESCRIPTION OF THE DRAWINGS

Some embodiments are illustrated by way of example, and not by way of limitation, in the figures of the accompanying drawings and in which like reference numerals refer to similar elements.

FIG. 4A1 is a partially schematic cross-sectional view taken from the location indicated in FIG. 3A.

FIG. 4A2 is an enlargement of a part of a partially schematic cross-sectional view from the location indicated in FIG. 4A1.

FIG. 5A1 is a partially schematic cross-sectional view taken from the location indicated in FIG. 3A.

FIG. 5A2 is an enlargement of a part of a partially schematic cross-sectional view from the location indicated in FIG. 5A1.

FIG. 6A1 is a partially schematic cross-sectional view taken from the location indicated in FIG. 3B.

FIG. 6A2 is an enlargement of a part of a partially schematic cross-sectional view from the location indicated in FIG. 6A1.

DETAILED DESCRIPTION

Figure 2A:
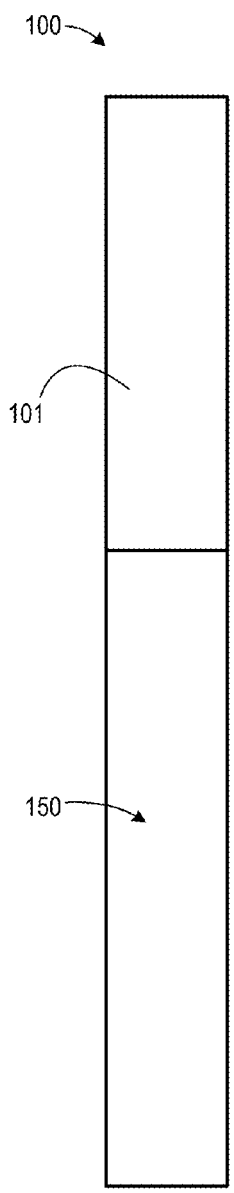
FIG. 2A is partially schematic plan view showing an exterior face of a load restraint strip according to at least some embodiments.

FIG. 2A is partially schematic plan view showing an exterior face 150 of a load restraint strip 100 according to at least some embodiments. As used herein when referring to a load restraint strip or element thereof, an "exterior" side, surface, face or other aspect of a load restraint strip or element refers to a side, surface, face or other aspect of that load restraint strip or element that faces away from restrained cargo when that load restraint strip is installed as part of a system to restrain that cargo. Conversely, an "interior" side, surface, face or other aspect of a load restraint strip or element refers to a side, surface, face or other aspect of that load restraint strip or element that faces toward restrained cargo when that load restraint strip is installed as part of a system to restrain that cargo. FIG. 2A shows load restraint strip 100 in a lined configuration. In particular, and as explained in further detail below, a release paper liner 101 is attached.

Figure 2B:
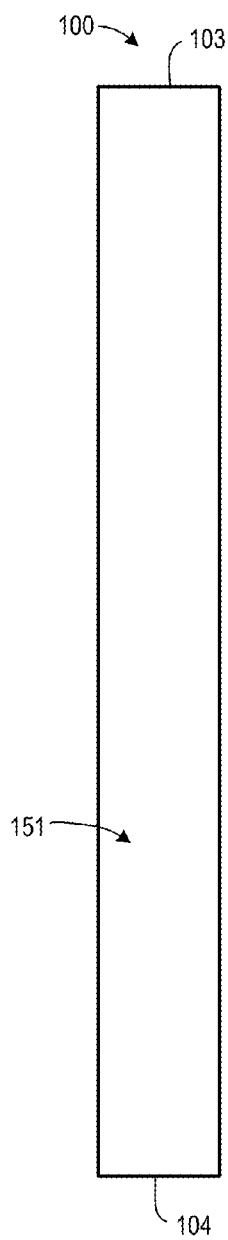
FIG. 2B is a partially schematic plan view showing an interior face of the load restraint strip of FIG. 2A.

FIG. 2B is a partially schematic plan view showing an interior face 151 of load restraint strip 100. As indicated in FIG. 2B, strip 100 has a working portion 102W. In the embodiment of strip 100, working portion 102W extends the entire length of strip 100 from a first strip end 103 to a second strip end 104. In other embodiments, however, the working portion of a load restraint strip may be less than the entire length of that strip.

In some embodiments, multiple strips 100 may be joined together and wound on a roll. Lines of perforations may separate ends 104 and 103 of adjacent strips strip 100. Strips 100 can be removed from the roll by tearing or cutting along the lines of perforations.

Figure 2C:
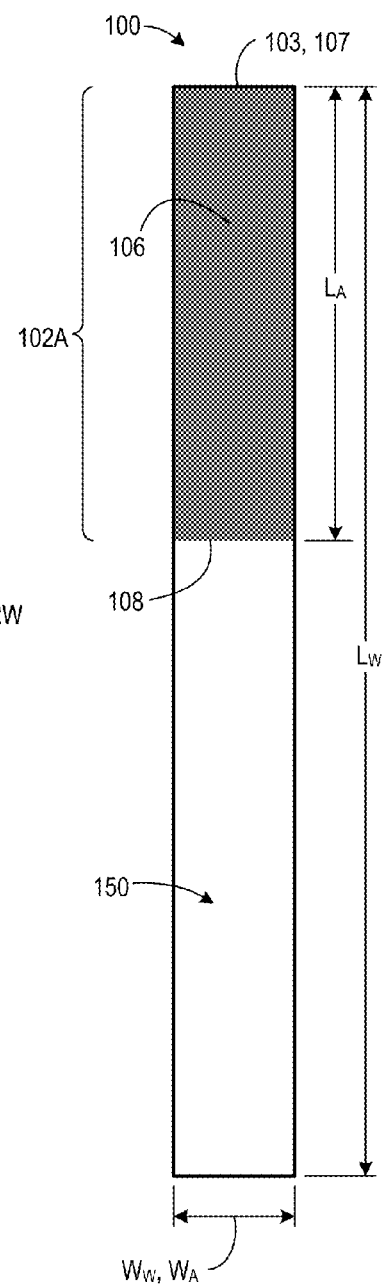
FIG. 2C is a partially schematic plan view showing the exterior face of the load restraint strip FIG. 2A after removal of a release paper liner.

FIG. 2C is a partially schematic plan view showing exterior face 150 of load restraint strip 100. In FIG. 2C, release paper liner 101 has been removed so as to expose an attachment layer 106. As explained in more detail below, attachment layer 106 includes a layer of adhesive that is exposed when liner 101 is removed and which is configured for attaching an attachment region 102A of working portion 102W to a shipping container wall. In the embodiment of strip 100, attachment layer 106 extends throughout attachment region 102A. A first end 107 of attachment layer 106 and of attachment region 102A is aligned with first end 103 of strip 100 and of working portion 102W. A second end 108 of attachment layer 106 and of attachment region 102A is located between first end 103 and second end 104 of strip 100 and of working portion 102W. As indicated in FIG. 2C, working portion 102W has a length $L_W$ and a width $W_W$. Attachment region 102A has a length $L_A$ and a width $W_A$, with $W_A = W_W$ in the embodiment of strip 100. In at least some embodiments, $L_W$ is between 9 and 14 feet (e.g., 12 feet), $L_A$ is between 2 and 6 feet (e.g., 5 feet) and $W_W$ is between 10 and 20 inches (e.g., 16 inches). In some embodiments $W_A$ may be less than $W_W$.

As also shown in FIG. 2C, exterior face 150 of strip 100 in attachment region 102A is colored differently from regions of exterior face 150 outside of attachment region 102A. As used herein, "colored differently" or similar terms refers to a difference in color having a substantial contrast that is easily perceptible by a human from a distance of approximately ten feet and in reduced lighting conditions (e.g., in a darkened cargo container when illuminated by a flashlight from ten feet away). Table 1 lists several examples of color combinations according to some embodiments. Table 1 is not intended as an exhaustive list of all possible colors or color combinations that may be used.

TABLE 1

| Exterior face color (regions outside attachment region) | Exterior face color (attachment region, when exposed) |
|---|---|
| any of white, off-white, beige or light brown | blue |
| any of white, off-white, beige or light brown | black |
| any of white, off-white, beige or light brown | dark gray |
| any of white, off-white, beige or light brown | green |
| any of white, off-white, beige or light brown | red |
| any of white, off-white, beige or light brown | orange |
| any of white, off-white, beige or light brown | bright yellow |

TABLE 1-continued

| Exterior face color (regions outside attachment region) | Exterior face color (attachment region, when exposed) |
|---|---|
| any of white, off-white, beige or light brown | purple |
| any of blue, black, dark gray, green, red, orange, purple, bright yellow | any of white, off-white, beige or light brown |

Although FIG. 2C shows attachment region 102A having a first solid color and the regions of exterior face 150 outside of attachment region 102A having a second solid color, this need not be the case. For example, the regions of exterior face 150 outside of attachment region 102A could have a lightly colored pattern and attachment region 102A could have a darkly colored pattern. As another example, and as discussed below in conjunction with FIG. 11, a part of attachment region 102A adjacent end 108 could have a first color and the remainder of exterior face 150 could have a second color.

Figure 3A:
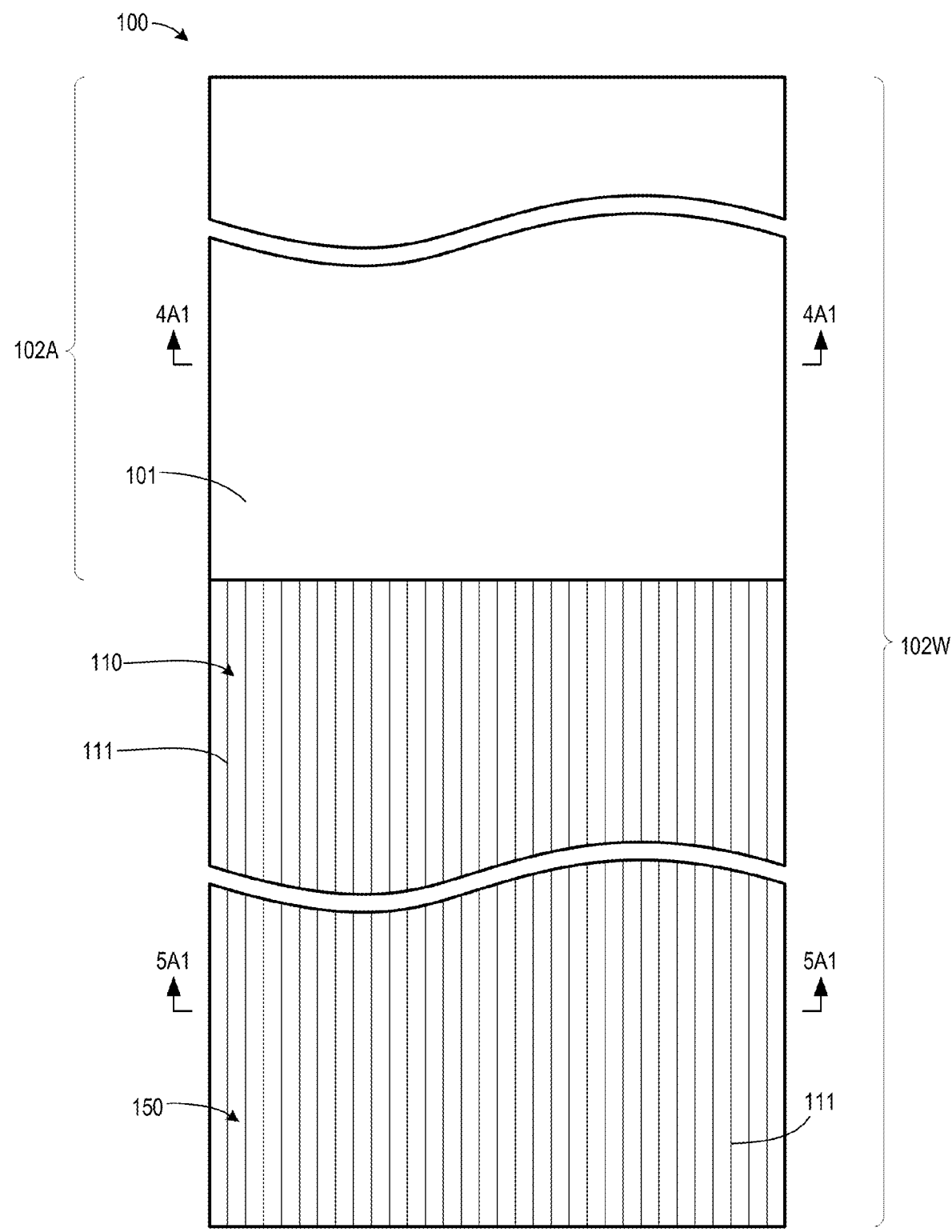
FIG. 3A is a partially schematic enlarged plan view showing the exterior face of the load restraint strip of FIG. 2A.
Figure 3B:
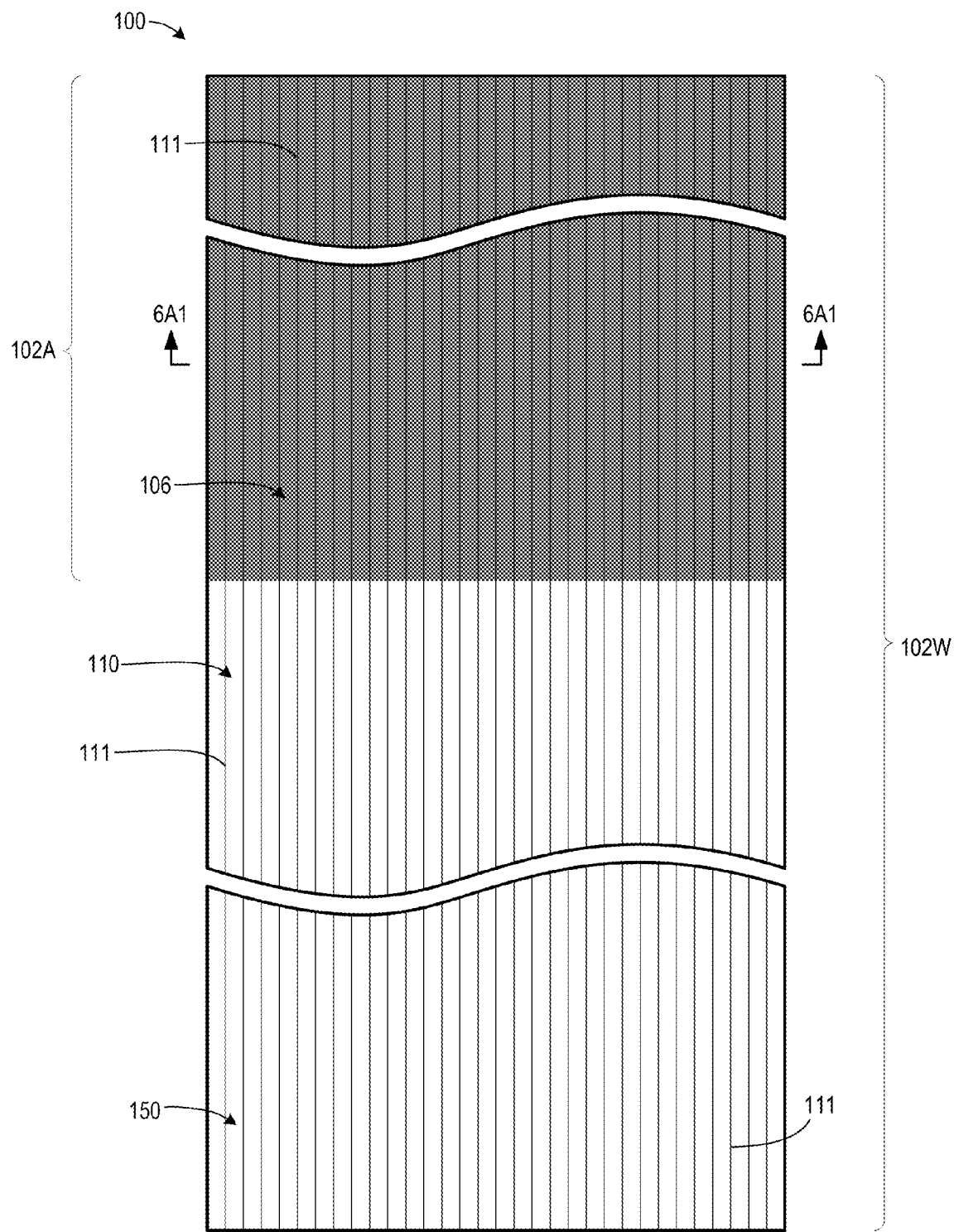
FIG. 3B is a partially schematic enlarged plan view showing the exterior face of the load restraint strip of FIG. 2A after removal of a release paper liner.

FIG. 3A is a partially schematic enlarged plan view showing exterior face 150 of load restraint strip 100. FIG. 3B is similar to FIG. 3A, but shows exterior face 150 after removal of release paper liner 101 so as to expose attachment layer 106. For convenience, wave-shaped interruptions are added to FIGS. 3A and 3B to indicate that portions of strip 100 have been omitted. As seen in FIGS. 3A and 3B, and as discussed more fully below, strip 100 includes a plurality of reinforcing fibers 111 in a reinforcement layer 110. Fibers 111 are indicated as black lines on exterior face 150. To avoid obscuring FIGS. 3A and 3B with unnecessary detail, the number of black lines is significantly less than the number of reinforcing fibers that would be present in an actual strip 100. Moreover, fibers 111 could be white, off-white or otherwise lightly colored, translucent or transparent.

Figure 1:
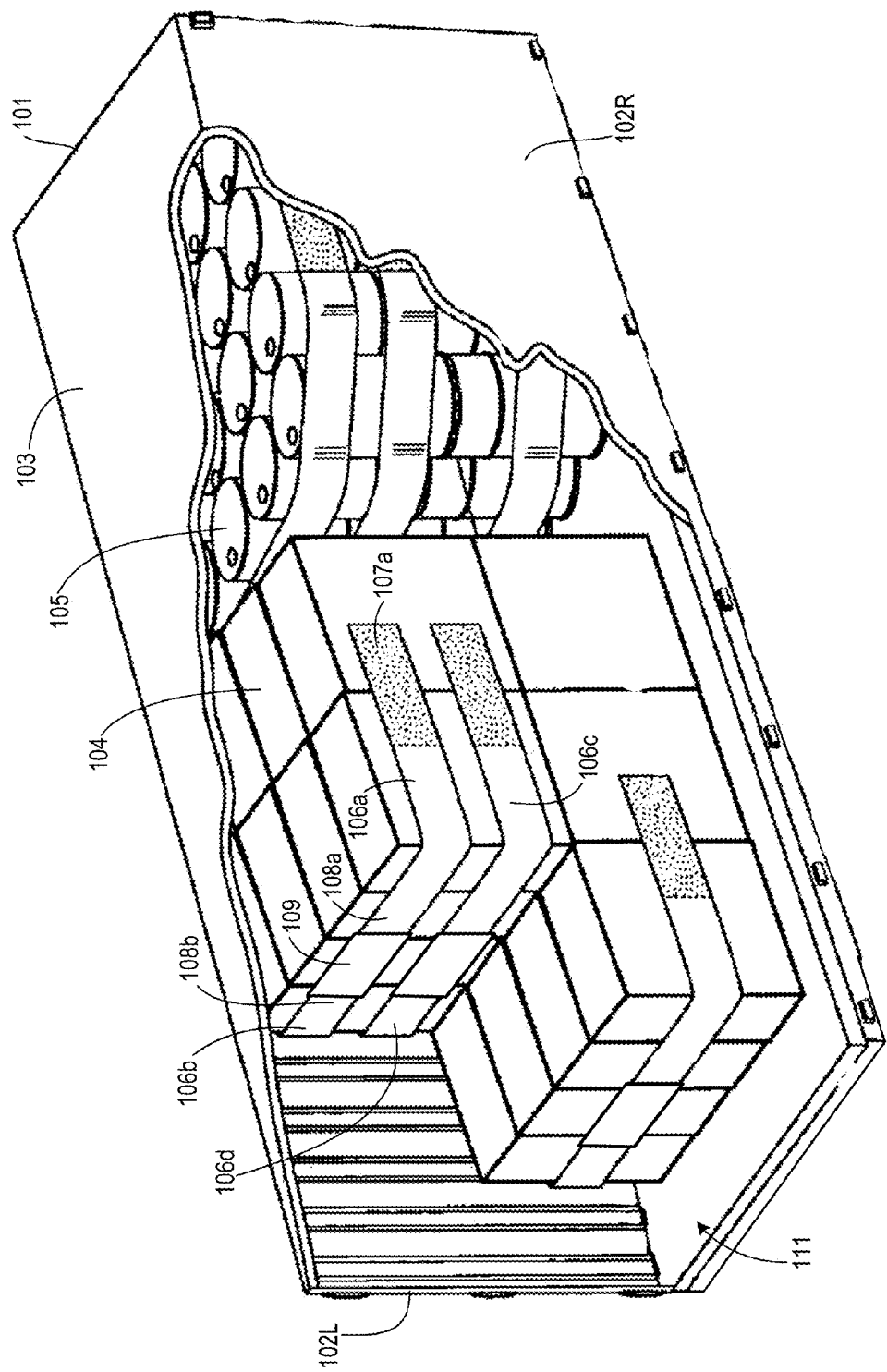
FIG. 1 illustrates a technique for restraining cargo within a shipping container.

FIG. 4A1 is a partially schematic cross-sectional view of strip 100 taken from the location indicated in FIG. 3A. FIG. 4A2 is an enlargement of a part of that partially schematic cross-sectional view from the location indicated in FIG. 4A1. FIG. 4A2 shows elements of attachment region 102A when load restraint strip 100 is in a lined configuration, i.e., with release paper liner 101 in place. In addition to adhesive layer 106 and reinforcement layer 110, strip 100 includes a base layer 114. Reinforcement layer 110 and base layer 114 extend throughout the entire length of working portion 102W of strip 100, whereas attachment layer 106 is confined to attachment region 102A.

Base layer 114 includes a band 115 of base layer material. In the embodiment of load restraint strip 100, band 115 is a continuous piece of spun bonded polyethylene fiber material that extends the entire length $L_W$ and width $W_W$ of working portion 102W. Examples of such material includes the product sold under the trade name TYVEK. In other embodiments, another material may be used in base layer 114. Examples of other base layer materials include bands of other types of spun bonded polymer fibers, films of polyester, polyethylene terephthalate (e.g., such as films sold under the trade name MYLAR) or other polymers, paper, bands of woven, knitted or felted natural fibers (e.g., cotton), and bands of woven or knitted artificial fibers. In still other embodiments, multiple materials may be used in a base layer and/or a base layer may comprise multiple separate material pieces. Exemplary thicknesses for a spun bonded polyester fiber base layer 114 are between 8 mils and 11 mils, where 1 mil=0.001 inch=0.0254 millimeters (mm). This range is solely for purposes of example, however. Embodiments include load restraint strips in which a base layer material band has a thickness substantially outside this range. In at least some embodiments in which base layer 114 is formed from spun bonded polyethylene fiber material or from another opaque or translucent material, at least an exterior side of base layer 114 may be white, off-white or otherwise lightly colored.

Reinforcement layer 110 is fixed relative to base layer 114. In particular, reinforcement fibers 111 are bonded to an exterior side of band 115 by a laminating adhesive 118. In the embodiment of strip 100, fibers 110 are parallel to one another and to the length $L_W$ direction of working portion 102W. In some embodiments, fibers 110 are polymer fibers having a denier (i.e., a linear mass density in grams per 9000 meters) of between about 1400 and about 1650. In some embodiments, fibers 110 may have a denier between about 1450 and about 1600. In certain embodiments, the denier of fibers 110 may be between about 1479 and about 1547, with target denier of about 1513. In some embodiments, reinforcement layer 110 includes between about 100 reinforcing fibers 111 and about 320 reinforcing fibers 111. Exemplary materials for fibers 111 include polyester. Table 2 shows exemplary properties for polyester fibers used in some embodiments for fibers 111.

TABLE 2

Exemplary polyester fiber properties

| Property | Target Value | Min. Value | Max. Value |
|---|---|---|---|
| liner density (denier, i.e. g/9000 m) | 1513 | 1479 | 1547 |
| break load (pounds) | 26.6 | 24.6 | 28.7 |
| elongation at break (%) | 10.3 | 8.8 | 11.8 |
| elongation at 10 lb. load (%) | 3.4 | 2.9 | 3.9 |
| shrinkage, free (%) | 8.4 | 4.8 | 12.0 |

The ranges in Table 2 are solely for purposes of example. Embodiments include load restraint strips in which reinforcing fibers have one or more properties significantly outside a range indicated in Table 2. Embodiments also include load restraint strips in which a reinforcement layer comprises reinforcement fibers formed from glass, polypropylene, carbon, or some other material.

In at least some embodiments, laminating adhesive 118 is a transparent ethylene vinyl acetate water based copolymer adhesive having a viscosity between about 2900 centipoise (cps) and about 3200 cps. Embodiments include load restraint strips in which a laminating adhesive has a viscosity significantly outside this range and/or comprises a different type of adhesive. As indicated above, adhesive 118 is used to bond reinforcing fibers 111 to an exterior side of band 115. In some other embodiments, reinforcing fibers may also or alternatively be bonded to an interior side of a base layer material.

Attachment layer 106 is fixed relative to reinforcement layer 110 and relative to base layer 114. Unlike reinforcement layer 110 and base layer 114, however, and as seen in FIGS. 2C and 3B, attachment layer 106 is confined to attachment portion 102A. In the embodiment of load restraint strip 100, attachment layer 106 comprises a first adhesive layer 121, a second adhesive layer 119 and a substrate layer 120. Substrate layer 120 at least partially separates adhesive layers 121 and 119. In some embodiments, however, substrate 120 may include holes or other perforations permitting direct contact between adhesive layers 121 and 119 in certain regions. Release paper liner 101 is affixed to the exterior side of adhesive layer 121 when strip 100 is in a lined configuration. Liner 101 can be formed from, e.g., a paper product that is treated to resist the adhesive of layer 121. Such products include paper that has been coated or otherwise impregnated with wax, silicone or other non-stick material.

In at least some embodiments, adhesive layers 121 and 119 contain the same type of adhesive. In at least some such embodiments, adhesive layers 121 and 119 contain an acrylic adhesive having a shear strength of between about 50 psi and about 100 psi. Embodiments include load restraint strips in which an adhesive layer adhesive has properties significantly outside this range and/or comprises a different type of adhesive. In some embodiments attachment layer 106 has a thickness of approximately 3 mils, although embodiments include load restraint strips with attachment layers having a substantially different thickness.

Substrate layer 120 may comprise a film of polyethylene terephthalate (PET) or other polymer and may have a thickness of between about 0.5 mils and about 1.0 mils. When a substrate layer is present, it may make little or no contribution to the load restraining strength of strip 100 and may simply serve as a carrier for adhesive layers 121 and 119. In particular, attachment layer 106 may initially take the form of a double-sided adhesive tape having substrate layer 120 sandwiched by adhesive layers 119 and 121. Liner 101 may be attached to one side of that tape. A portion of that double sided tape can be cut from a larger roll and applied to a portion of a partially-completed strip 100 during the manufacturing process. A substrate layer may not be present in some embodiments. In some such embodiments lacking an attachment layer substrate, a layer of acrylic adhesive substantially similar to layer 121 can be applied to a partially-completed strip 100 using transfer tape. Such a layer could be colored in a manner similar to adhesive layer 121, as described below.

In other embodiments, layers 121 and 119 may comprise different types of adhesives. As explained in more detail below, adhesive layer 121 is adhered to a shipping container wall when strip 100 is installed. Many applications require that the adhesive bond between layer 121 and a container wall be nonpermanent. When a container reaches its destination and strip 100 is removed, it is desirable that little or no adhesive residue remain on the container wall. For this and other reasons, it is often desirable for layer 121 to be a high shear strength pressure-sensitive acrylic adhesive that can accommodate a large temperature gradient. Because adhesive layer 119 does not contact a container wall, however, adhesive residue is not a concern for this layer. Accordingly, layer 119 can comprise other types of adhesives having different properties than the adhesive used for layer 121. For example, the adhesive of layer 119 could be selected to have higher shear and peel strengths than the adhesive of layer 121 so as to ensure that substrate layer 120 does not separate from strip 100 when strip 100 is removed from a container wall. In some such embodiments, the layer 119 adhesive could be a rubber based type of adhesive or could be an acrylic adhesive with a different formulation than the adhesive of layer 121.

As previously discussed in connection with FIG. 2C, and as is also indicated in FIG. 3B, removal of liner 101 exposes a color differential between exterior face 150 in attachment region 102A and regions of exterior face 150 outside of attachment region 102A. FIG. 4A2, as well as FIGS. 5A2 and 6A2, further illustrate how this color differential is achieved in the embodiment of strip 100. FIG. 5A1 is a partially schematic cross-sectional view of strip 100 taken from the location indicated in FIG. 3A. FIG. 5A2 is an enlargement of a part of that partially schematic cross-sectional view from the location indicated in FIG. 5A1. FIG. 5A2 is similar to FIG. 4A2, but with attachment layer 106 and liner 101 removed to show the structure of strip 100 in regions of working portion 102W outside of attachment region 102A. FIG. 6A1 is a partially schematic cross-sectional view of strip 100 taken from the location indicated in FIG. 3B. FIG. 6A2 is an enlargement of a part of that partially schematic cross-sectional view from the location indicated in FIG. 6A1. FIG. 6A2 is also similar to FIG. 4A2, but shows the structure of strip 100 in attachment region 102A when liner 101 is removed to expose adhesive layer 121.

As shown in FIGS. 4A2 and 6A2, the adhesive of layer 121 has been colored. Acrylic adhesives are normally clear. In some embodiments, the formulation for the adhesive of layer 121 includes a tinting agent (e.g., pigment) that has been added to result in a desired coloration. Tinting agents suitable for use with acrylic adhesives are known. Although the substrate of layer 120 and the adhesive of layer 119 are not colored in the embodiment of strip 100, this need not be the case. As one example, layer 120 and/or layer 119 could also be colored so as to increase the darkness or other visual characteristic of coloration in attachment region 102A. As another example, and as described below, layer 120 and/or layer 119 could be colored instead of layer 121.

As seen in FIG. 5A2, exterior face 150 of load strip 100 outside of attachment region 102A will have the coloration of reinforcing fibers 111, laminating adhesive 118 and the exterior side of band 115 (assuming fibers 111 and/or adhesive 118 are not opaque). In the embodiment of strip 100, and as previously indicated, laminating adhesive 118 is clear and fibers 111 and band 115 are white, off-white or otherwise lightly colored, or translucent or transparent (in the case of fibers 111). As a result, there is a color contrast between attachment region 102A and regions of exterior face 150 outside attachment region 102A.

Figure 7A:
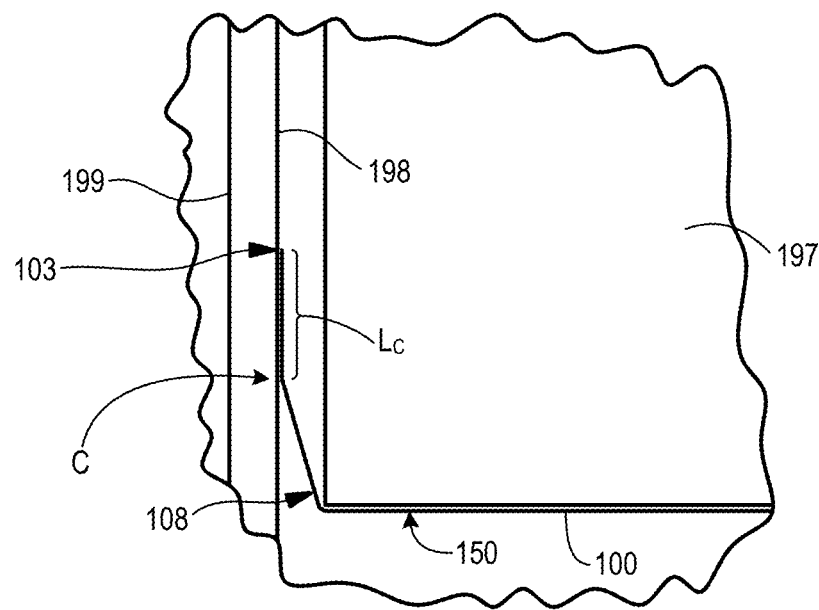
FIGS. 7A and 7B are partially schematic top and rear views, respectively, of cargo that has been improperly secured.

FIGS. 7A through 8B show the functional relationship between load restraint strip 100 and the differently colored regions on exterior face 150. FIG. 7A is a partially schematic top view of a portion of a loaded cargo container where load restraint strip 100 has been improperly installed. Shown in FIG. 7A is a portion of a container wall 199 and a portion of a cargo crate 197. The rear of the cargo container is toward the bottom of the drawing in FIG. 7A. Crate 197 is positioned close to an inside face 198 of wall 199.

As also indicated in FIG. 7A, load restraint strip 100 was installed so that less than all of attachment region 102A is in contact with inside wall face 198. In particular, end 108 of attachment region 102A is positioned rearward of the location C where exterior face 150 separates from inside wall face 198. As a result, the length $L_C$ of the portion of attachment region 102A in contact with inside wall face 198 is less than the length $L_A$ (see FIG. 2C) of attachment region 106. Accordingly, less than all of attachment layer 106 is being utilized, and the bond between strip 100 and inside wall face 198 is weaker than it would be if attachment layer 106 were more fully engaged with wall face 198.

Figure 7B:
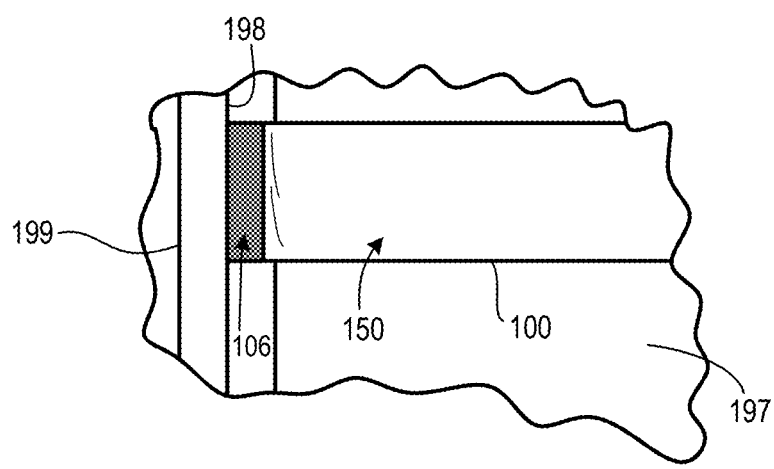

FIG. 7B is a partially schematic rear view of a portion of the loaded cargo container of FIG. 7A. As shown in FIG. 7B, the portion of attachment layer 106 not engaged with inside wall face 198 is highlighted by the color difference between portions of exterior face 150. Upon viewing the arrangement of FIG. 7B, a loading supervisor or other inspector could readily determine that strip 100 is not properly installed.

Figure 8A:
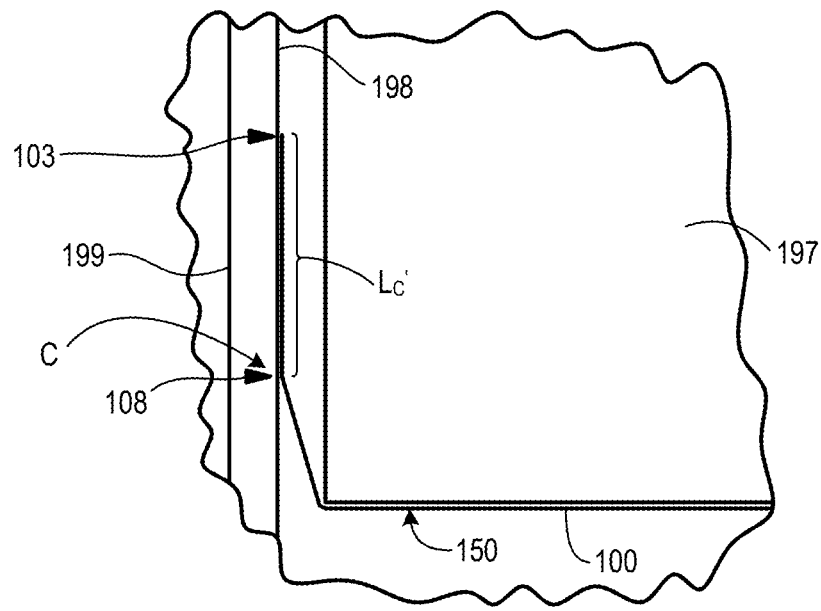
FIGS. 8A and 8B are partially schematic top and rear views, respectively, of cargo that has been properly secured.

FIG. 8A is a partially schematic top view of a portion of a loaded cargo container where load restraint strip 100 has been properly installed. As in FIG. 7A, a portion of container wall 199 and a portion of a cargo crate 197 are shown. The rear of the cargo container is toward the bottom of FIG. 8A. Crate 197 is positioned close to inside wall face 198. In FIG. 8A, load restraint strip 100 was installed so that all of attachment region 102A is in contact with inside wall face 198. End 108 of attachment region 102A coincides with location C' where exterior face 150 separates from inside wall face 198. As a result, the length $L_C'$ of the portion of attachment region 102A in contact with inside wall face 198 is equal to length $L_A$ of attachment region 106 and is greater than length $L_C$ in the scenario of FIG. 7A. All of attachment layer 106 is being utilized in the scenario of FIG. 8A, and the bond between strip 100 and inside wall face 198 is stronger because attachment layer 106 is fully engaged with wall face 198.

Figure 8B:
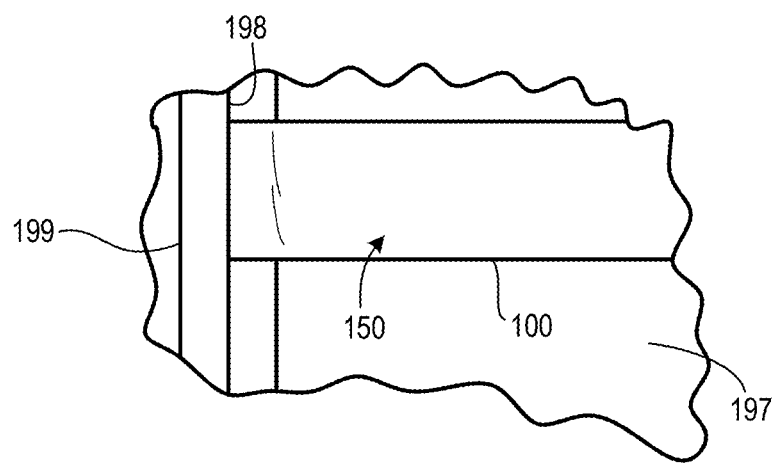

FIG. 8B is a partially schematic rear view of a portion of the loaded cargo container of FIG. 8A. As shown in FIG. 8B, attachment layer 106 is not visible. Upon inspecting the strip 100 installation in FIG. 8B, the differently colored portion of exterior face 150 is not visible. A loading supervisor or other inspector could thus readily confirm that strip 100 has been properly installed.

FIG. 8B also shows a further advantage of load restraint strips according to various embodiments. It is a known practice for shippers to photograph cargo within a container after that cargo has been restrained and prior to closing the container. Such photographs can be used to document the manner in which the container was loaded and may be useful in the event that the cargo is damaged in transit. By including a differently-colored region of the exterior face that corresponds to a load restraint strip attachment region, such photographs can more clearly indicate whether cargo was properly restrained at the time of loading. This can have advantages for cargo damage root cause analysis conducted by surveyors, insurance companies and carriers. Without such indications, cargo claims disputes may be extremely difficult to resolve.

Figure 9A:
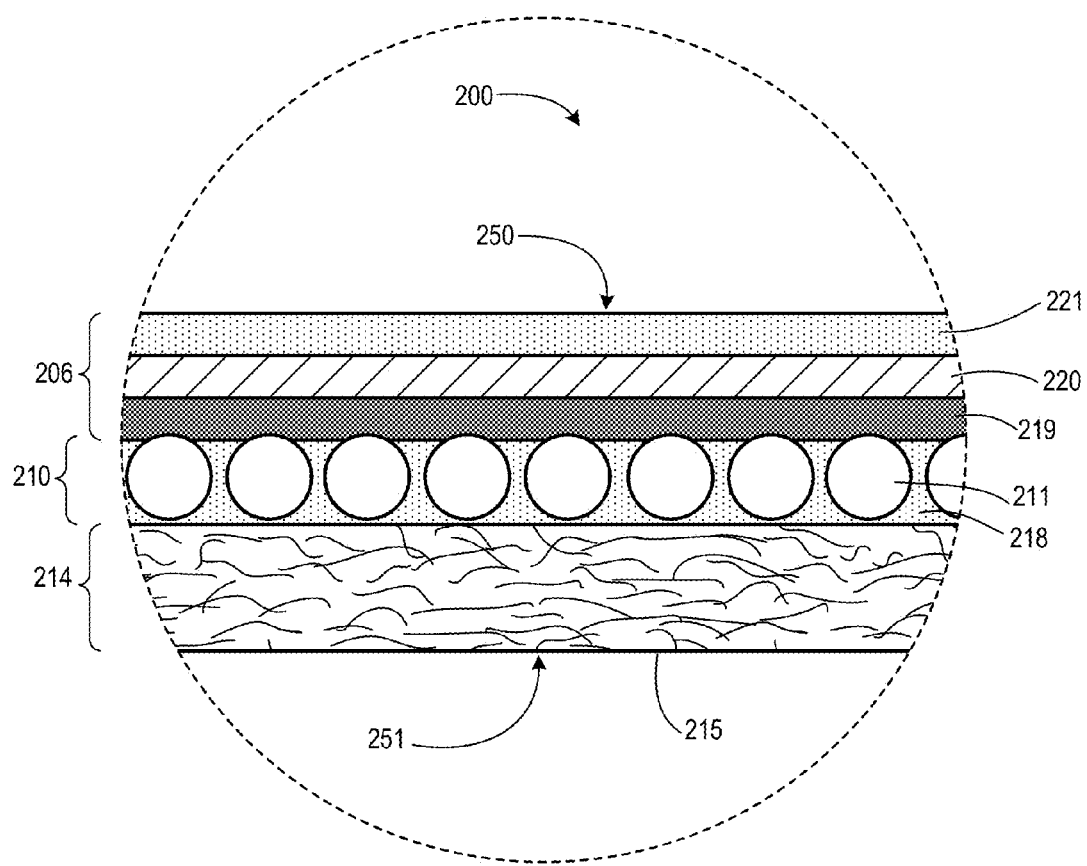
FIGS. 9A through 9D are enlarged, partially schematic cross-sectional views of attachment regions of load restraint strips according to some additional embodiments.

FIG. 9A is an enlarged, partially schematic cross-sectional view of a portion of an attachment region of a load restraint strip 200 according to some additional embodiments. Except as indicated below, load restraint strip 200 is similar to load restraint strip 100 of FIGS. 2A through 8B. Load restraint strip 200 includes an exterior face 250 and an attachment layer 206. Attachment layer 206 includes a first adhesive layer 221, a substrate layer 220 and a second adhesive layer 219. Substrate layer 220 is similar to substrate layer 120. Except as described below, first and second adhesive layers 221 and 219 are respectively similar to first and second adhesive layers 121 and 119. Strip 200 also includes a reinforcement layer 210 (comprising reinforcement fibers 211 and laminating adhesive 218 similar to fibers 111 and laminating adhesive 118), a base layer 214 (comprising base layer material band 215 similar to band 115) and interior face 251. As with restraint strip 100, base layer 214 and reinforcement layer 210 extend throughout the working portion of strip 200, but attachment layer 206 does not extend beyond the attachment region of strip 200.

Strip 200 differs from strip 100 based on the manner in which exterior face 250 in the strip 200 attachment region is colored differently from regions of exterior face 250 outside of the attachment region. In the embodiment of strip 200, first adhesive layer 221 and substrate layer 220 layer are clear. However, the adhesive of layer 219 has been colored. In particular, the formulation for the adhesive of layer 219 includes a tinting agent that has been added to result in a desired coloration. The embodiment of strip 200 may be advantageous if there is a concern that a tinting agent in an adhesive layer contacting a container wall may leave colored residue when a load restraint strip is removed.

Figure 9B:
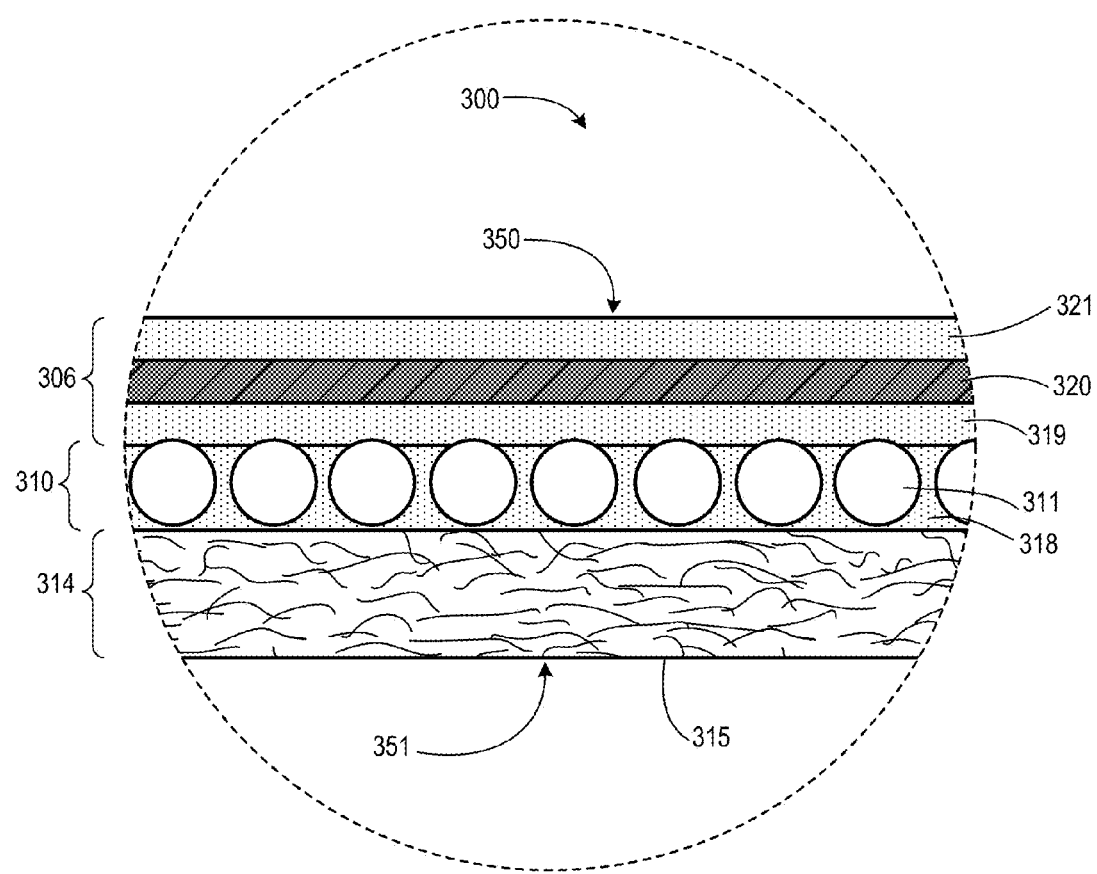

FIG. 9B is an enlarged, partially schematic cross-sectional view of a portion of an attachment region of a load restraint strip 300 according to certain additional embodiments. Except as indicated below, load restraint strip 300 is also similar to load restraint strip 100 of FIGS. 2A through 8B. Load restraint strip 300 includes an exterior face 350 and an attachment layer 306. Attachment layer 306 includes a first adhesive layer 321, a substrate layer 320 and a second adhesive layer 319. Second adhesive layer 319 is similar to adhesive layer 119. Except as described below, first adhesive layer 321 and substrate layer 320 are respectively similar to first adhesive layer 121 and substrate layer 120. Strip 300 also includes a reinforcement layer 310 (comprising reinforcement fibers 311 and laminating adhesive 318 similar to fibers 111 and laminating adhesive 118), a base layer 314 (comprising base layer material band 315 similar to band 115) and interior face 351. As with restraint strip 100, base layer 314 and reinforcement layer 310 extend throughout the working portion of strip 300, but attachment layer 306 does not extend beyond the attachment region of strip 300.

Strip 300 also differs from strip 100 based on the manner in which exterior face 350 in the strip 300 attachment region is colored differently from regions of exterior face 350 outside of the attachment region. In the embodiment of strip 300, first and second adhesive layers 321 and 319 are clear. However, the substrate material in substrate layer 320 is colored. For example, the substrate material in layer 320 may comprise a sheet of colored PET film. The embodiment of strip 300 may also be advantageous if there is a concern that tinting in an adhesive layer contacting a container wall may leave colored residue when a load restraint strip is removed or that adding a tinting agent to an adhesive may adversely affect its strength.

Figure 9C:
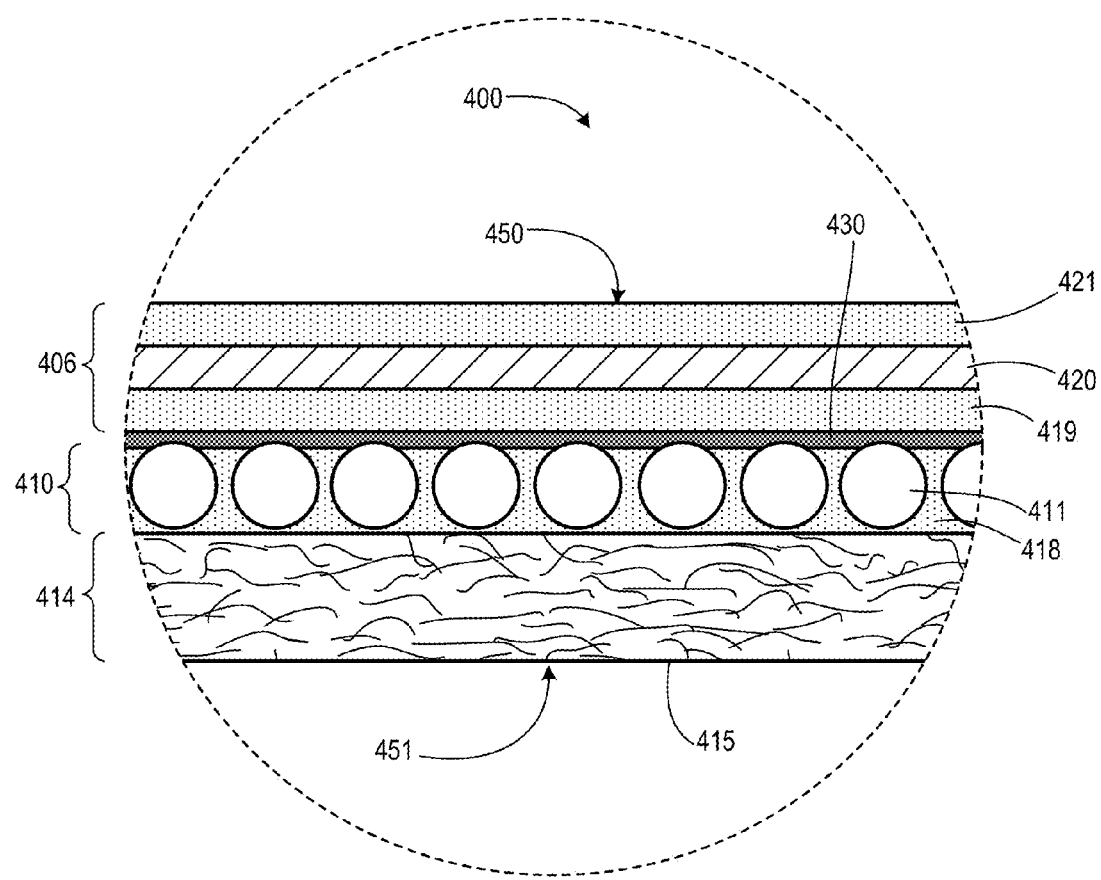

FIG. 9C is an enlarged, partially schematic cross-sectional view of a portion of an attachment region of a load restraint strip 400 according to certain further embodiments. Except as indicated below, load restraint strip 400 is also similar to load restraint strip 100 of FIGS. 2A through 8B. Load restraint strip 400 includes an exterior face 450 and an attachment layer 406. Attachment layer 406 includes a first adhesive layer 421, a substrate layer 420 and a second adhesive layer 419. Substrate layer 420 and second adhesive layer 419 are similar to substrate layer 120 and second adhesive layer 119. Except as described below, first adhesive layer 421 is similar to first adhesive layer 121. Strip 400 includes a reinforcement layer 410 (comprising reinforcement fibers 411 and laminating adhesive 418 similar to fibers 111 and laminating adhesive 118), a base layer 414 (comprising base layer material band 415 similar to band 115) and interior face 451. As with restraint strip 100, base layer 414 and reinforcement layer 410 extend throughout the working portion of strip 400, but attachment layer 406 does not extend beyond the attachment region of strip 400.

Strip 400 also differs from strip 100 based on the manner in which exterior face 450 in the strip 400 attachment region is colored differently from regions of exterior face 450 outside of the attachment region. In the embodiment of strip 400, first adhesive layer 421, substrate layer 420 and second adhesive layer 419 are clear. However, a separate coloration layer 430 is applied to the exterior side of reinforcement region 410 in the attachment region of the strip 400 working portion. Coloration layer 430 could be, e.g., a layer of ink.

Figure 9D:
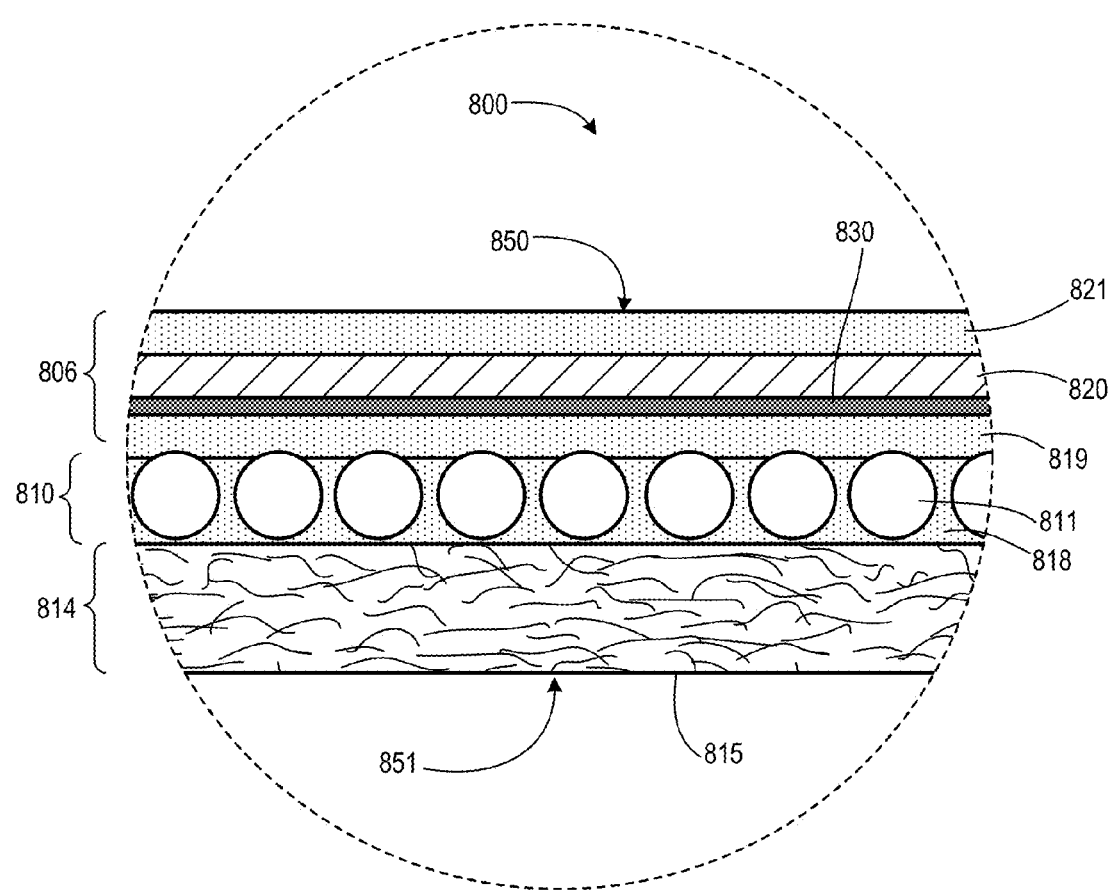

FIG. 9D is an enlarged, partially schematic cross-sectional view of a portion of an attachment region of a load restraint strip 800 according to certain additional embodiments. Except as indicated below, load restraint strip 800 is also similar to load restraint strip 100 of FIGS. 2A through 8B. Load restraint strip 800 includes an exterior face 850 and an attachment layer 806. Attachment layer 806 includes a first adhesive layer 821, a substrate layer 820 and a second adhesive layer 819. First adhesive layer 821 and second adhesive layer 819 are similar to first adhesive layer 121 and second adhesive layer 119. Except as described below, substrate layer 820 is similar to substrate layer 120. Strip 800 includes a reinforcement layer 810 (comprising reinforcement fibers 811 and laminating adhesive 818 similar to fibers 111 and laminating adhesive 118), a base layer 814 (comprising base layer material band 815 similar to band 115) and interior face 851. As with restraint strip 100, base layer 814 and reinforcement layer 810 extend throughout the working portion of strip 800, but attachment layer 806 does not extend beyond the attachment region of strip 800.

Strip 800 also differs from strip 100 based on the manner in which exterior face 850 in the strip 800 attachment region is colored differently from regions of exterior face 850 outside of the attachment region. In the embodiment of strip 800, first adhesive layer 821 and second adhesive layer 819 are clear. However, a separate coloration layer 830 is applied to the interior side of the film within substrate layer 820. Coloration layer 830 could be, e.g., a layer of ink. Inks suitable for printing polyethylene terephthalate film are known. Printing the interior side of a substrate film may be advantageous if there is concern that ink printed on that film may migrate into adhesive layer 821 and potentially leave colored residue on a container wall. In some embodiments, however, ink may also or alternatively be printed on an exterior side of a substrate film.

In some further embodiments not shown in the drawings, a color difference between an attachment region part of an exterior face and regions of that exterior face outside of the attachment region can be achieved by applying ink to an exterior side of a base material band in the attachment region. As one example of such an embodiment, a load restraint strip may have a reinforcement layer bonded to an interior face of a base layer. Ink could then be applied to the exterior side of the base layer in the attachment region prior to adding an attachment layer.

Figure 10:
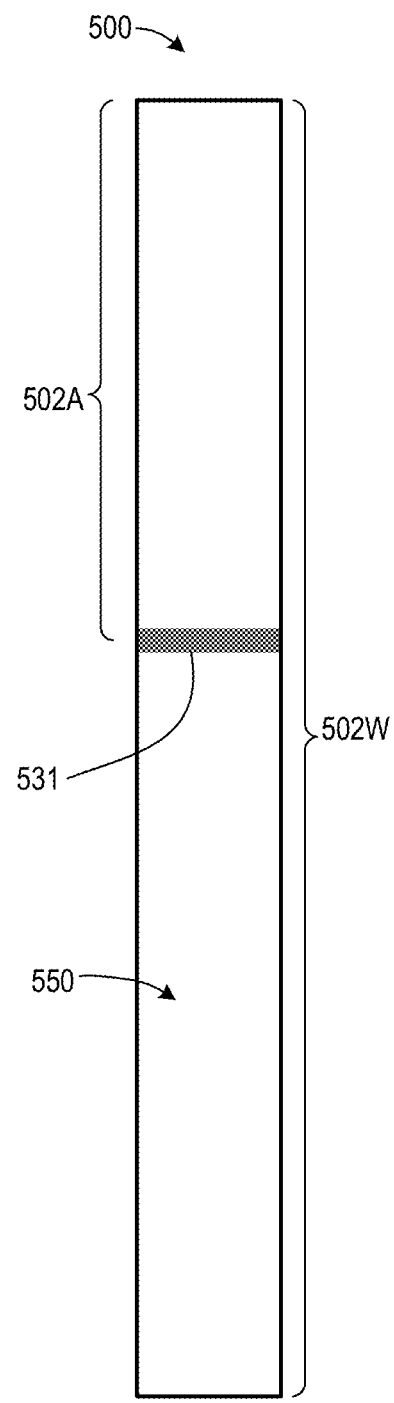
FIG. 10 is a partially schematic plan view showing an interior face of a load restraint strip according to certain further embodiments.

FIG. 10 is a partially schematic plan view showing an interior face 550 of a load restraint strip 500 according to some further embodiments. Except as described below, load restraint strip 500 may be similar to load restraint strips according to other embodiments. However, strip 500 includes a marking 531 on interior face 551. Marking 531 corresponds to the end of the attachment layer (not shown) in attachment region 502A on the exterior face. During installation of strip 500, an installer can use marking 531 as a guide when pressing attachment region 502A against a container wall. For example, the installer can apply a roller against the portion of interior face 551 extending between end 503 and marking 531. In some embodiments, marking 531 may extend further toward end 503 and/or may extend the entire length of attachment region 502A. Marking 531 can be, e.g., printed with ink.

Figure 11:
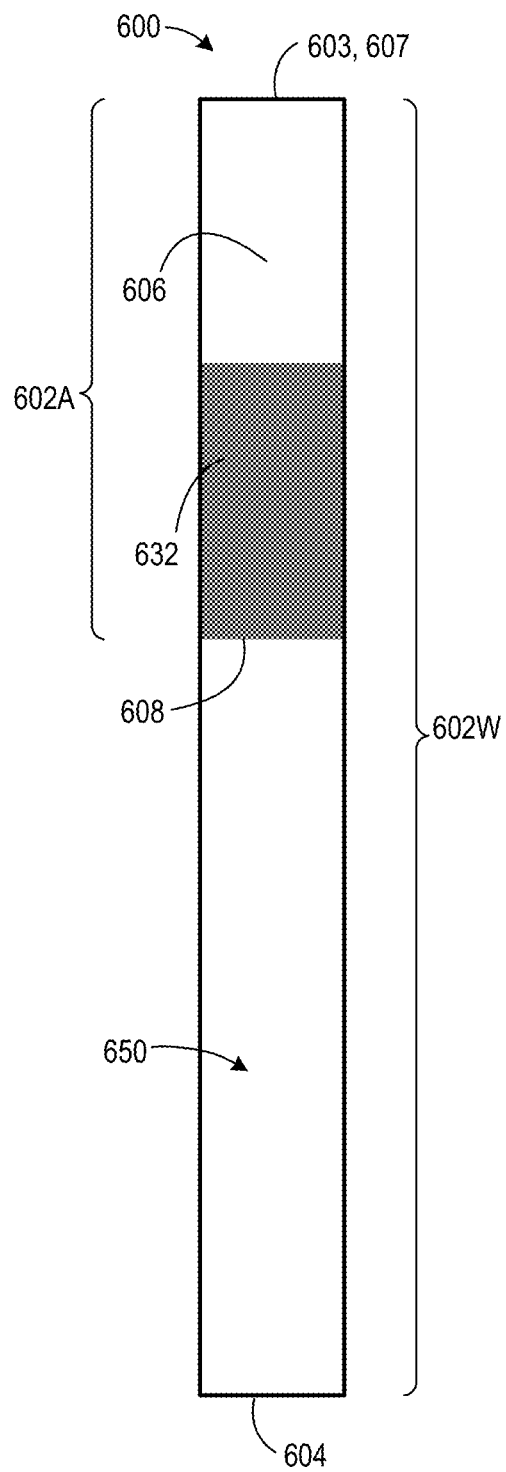
FIG. 11 is a partially schematic plan view showing an exterior face of a load restraint strip according to some embodiments.

In embodiments described thus far, exterior side coloration of an attachment region has extended throughout the entire attachment region. This need not be the case, however. For example, FIG. 11 is a partially schematic plan view showing an exterior face 650 of a load restraint strip 600 according to another embodiment. Except as other described, strip 600 may be similar to load restraint strips according to other embodiments. Strip 600 has a working portion 602W, an attachment region 602A, and an attachment layer 606 extending throughout region 602A. Strip 600 and working portion 602W have ends 603 and 604. Attachment region 602A and attachment layer 606 have ends 607 and 608. End 607 coincides with end 603. End 608 lies between ends 603 and 604. A region 632 of attachment region 602A has a different color than portions of exterior face 650 outside attachment region 602. However, region 632 does not extend the full length of region 602A. In some additional embodiments, region 632 may also or alternatively not extend the entire width of region 602A.

Further embodiments may include features in addition to or instead of features described thus far. For example, in some embodiments a load restraint strip may include a different type of reinforcement material. Examples of other types of reinforcement materials include cross-weave reinforcement such as is described in U.S. Pat. No. 7,329,074. Additional examples of other types of reinforcement materials include monolithic polymer sheets such as is described in U.S. Pat. No. 6,896,459.

Figure 12:
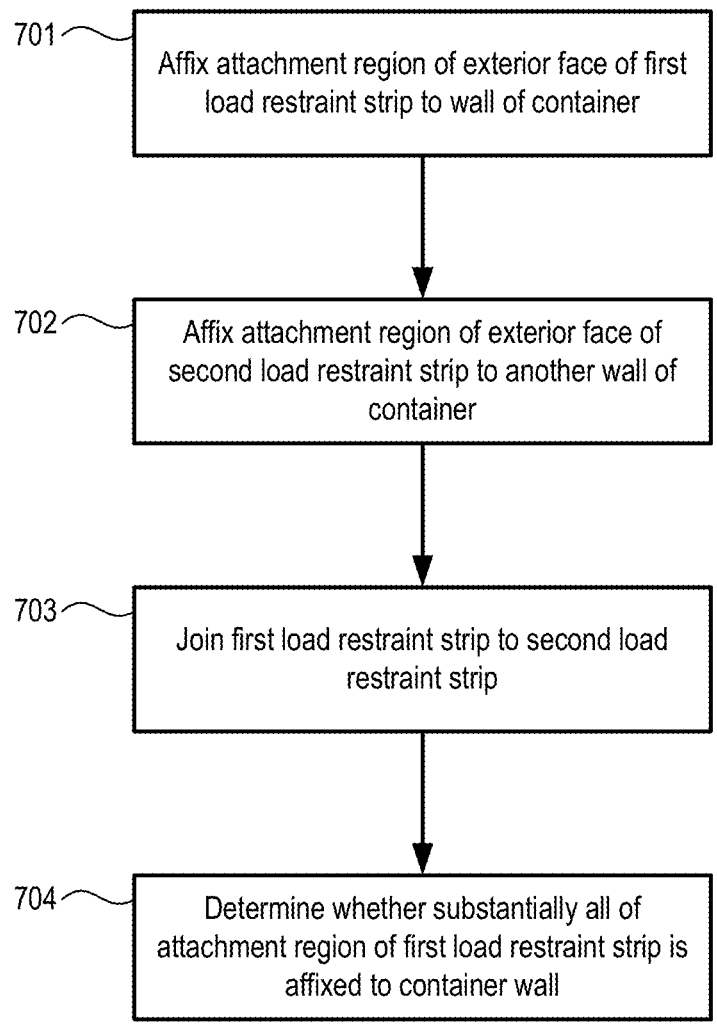
FIG. 12 is a block diagram showing steps of a method according to some embodiments.

FIG. 12 is a block diagram showing steps of a method according to some embodiments. In step 701, an attachment region of an exterior face of a first load restraint strip is affixed to an inside wall of a cargo container by removing a liner covering the attachment region of the first load restraint strip exterior face and pressing the exposed adhesive of the first load restraint strip attachment region exterior face to that inside wall. The other end of the first load restraint strip can then be temporarily taped to that same container wall. In step 702, an attachment region of an exterior face of a second load restraint strip is affixed to an opposite inside wall of a cargo container by removing a liner covering the attachment region of the second load restraint strip exterior face and pressing the exposed adhesive of the second load restraint strip attachment region exterior face to that opposite inside wall. The other end of the second load restraint strip can then be temporarily taped to that opposite inside wall. Cargo can then be loaded into the container. After loading that cargo, and as indicated at step 703, the ends of the first and second strips that were temporarily taped to the container walls are wrapped around the cargo, tightened, and joined with a separate adhesive patch. In step 704, a determination is made regarding whether substantially all of the attachment region of the first load restraint strip is affixed to the wall of the cargo container. Step 704 includes determining whether a portion of the attachment region of the first load restraint strip having a different color than other portions of the first load restraint strip exterior face is visible. This can comprise determining whether the installed first strip has the appearance indicated by FIG. 7B or the appearance indicated by FIG. 8B.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:
1. A load restraint strip, comprising:
a base layer extending throughout a working portion of the load restraint strip and comprising a base layer material;
a reinforcement layer fixed relative to the base layer, wherein the reinforcement layer extends throughout the working portion of the load restraint strip and includes a reinforcement material; and
an attachment layer fixed relative to the base and reinforcement layers and located in an attachment region on an exterior side of the load restraint strip, wherein the attachment layer includes a first adhesive layer and a differentially colored region extending over at least part of the attachment region, wherein the attachment region has a length less than a length of the working portion, and wherein the differentially colored region is colored differently from regions on the exterior side outside the attachment region.

2. The load restraint strip of claim 1, wherein the attachment layer extends throughout the attachment region.

3. The load restraint strip of claim 1, wherein the base layer extends throughout the length and a width of the working portion, wherein the reinforcement layer extends throughout the length and the width of the working portion, and wherein the reinforcement layer comprises a plurality of reinforcement fibers.

4. The load restraint strip of claim 1, wherein
the attachment layer includes a second adhesive layer and a substrate layer at least partially separating the first adhesive layer from the second adhesive layer, and
the first adhesive layer comprises an adhesive and a tinting agent, wherein the adhesive has a coloration resulting from the tinting agent, and wherein the adhesive coloration at least partially causes the differentially colored region to be colored differently from the regions on the exterior side outside the attachment region.

5. The load restraint strip of claim 1, wherein
the attachment layer includes a second adhesive layer and a substrate layer at least partially separating the first adhesive layer from the second adhesive layer, and
the second adhesive layer comprises an adhesive and a tinting agent, wherein the adhesive has a coloration resulting from the tinting agent, and wherein the adhesive coloration at least partially causes the differentially colored region to be colored differently from the regions on the exterior side outside the attachment region.

6. The load restraint strip of claim 5, wherein the first adhesive layer lacks a tinting agent and the substrate layer is transparent.

7. The load restraint strip of claim 1, wherein
the attachment layer includes a second adhesive layer and a substrate layer at least partially separating the first adhesive layer from the second adhesive layer, and
the substrate layer comprises a tinted polymer film, wherein the tinted polymer film at least partially causes the differentially colored region to be colored differently from the regions on the exterior side outside the attachment region.

8. The load restraint strip of claim 7, wherein the first adhesive layer and the second adhesive layer are untinted.

9. The load restraint strip of claim 1, wherein
the attachment layer includes a second adhesive layer and a substrate layer at least partially separating the first adhesive layer from the second adhesive layer, and
the substrate layer comprises coloration applied to an interior side thereof, wherein the coloration at least partially causes the differentially colored region to be colored differently from the regions on the exterior side outside the attachment region.

10. The load restraint strip of claim 9, wherein the coloration comprises ink printed on the interior side of a film within the substrate layer.

11. The load restraint strip of claim 1, wherein an exterior side of the reinforcement layer corresponding to the differentially colored region is colored differently from the regions on the exterior side outside the attachment region.

12. The load restraint strip of claim 1, wherein an exterior side of the base layer corresponding to the differentially colored region is colored differently from the regions on the exterior side outside the attachment region.

13. The load restraint strip of claim 1, further comprising at least one marking on an interior side of the load restraint strip indicating a boundary of the attachment region.

14. The load restraint strip of claim 1, wherein the working portion length is between 9 and 13 feet, wherein the attachment region length is between 2 and 6 feet, and wherein the load restraint strip has a width of between 10 and 18 inches.

15. The load restraint strip of claim 1, wherein
the working portion and the attachment region each includes first and second ends, the attachment region first end being aligned with the working portion first end,
the attachment region extends along a length of the working portion to a location between the working portion first end and the working portion second end, and
the at least part of the attachment region is less than all of the attachment region and comprises a portion of the attachment region adjacent the attachment region second end.

16. The load restraint strip of claim 1, wherein the exterior side outside the attachment region includes a color that is any of white, off-white, beige and light brown and the attachment region on the exterior side includes a color is any of blue, black, dark gray, green, red, orange, purple and bright yellow.

17. The load restraint strip of claim 1, wherein the exterior side outside the attachment region includes a color that is any of blue, black, dark gray, green, red, orange, purple and bright yellow and the attachment region on the exterior side includes a color that is any of white, off-white, beige and light brown.

18. The load restraint strip of claim 1, wherein the differentially colored region extends over less than all of the attachment region on the exterior side.

19. The load restraint strip of claim 1, wherein the differentially colored region extends over all of the attachment region on the exterior side.

20. A method comprising:
affixing an attachment region of an exterior face of a first load restraint strip to a wall of a cargo container;
affixing an attachment region of an exterior face of a second load restraint strip to another wall of the cargo container;
joining the first load restraint strip to the second load restraint strip; and
determining whether substantially all of the attachment region of the first load restraint strip is affixed to the wall of the cargo container by determining the visibility of a portion of the attachment region of the first load restraint strip having a different color than other portions of the first load restraint strip exterior face.

21. The method of claim 20, further comprising photographing the wall of the cargo container showing the visual coloration differential for documenting that the first load restraint strip was affixed to the wall of the cargo container.

* * * * *